350-332 SR

XR 4,113,361 /765 X 340/800 X 350/332 X 340/802

United States Patent [19]

Nakano 4,113,361

Sep. 12, 1978

[54] LIQUID CRYSTAL DISPLAY DEVICE

[75] Inventor: Harumi Nakano, Kunitachi, Japan

[73] Assignee: Casio Computer Co., Ltd., Tokyo, Japan

[21] Appl. No.: 654,725

[22] Filed: Feb. 2, 1976

[30] Foreign Application Priority Data

Feb. 4, 1975 [JP] Japan ........ 50/14554

[51] Int. Cl.[2] ........ G02F 1/13; G08B 5/36

[52] U.S. Cl. ........ 350/332; 340/336

[58] Field of Search ........ 350/160 LC; 340/336, 340/324 M

[56] References Cited

U.S. PATENT DOCUMENTS

| | | | |
|---|---|---|---|
| 3,781,863 | 12/1973 | Fujita | 350/160 LC X |
| 3,877,017 | 4/1975 | Kawakami et al. | 350/160 LC X |
| 3,898,646 | 8/1975 | Washizuka | 350/160 LC |
| 3,903,518 | 9/1975 | Hatsukano | 350/160 LC X |
| 3,976,994 | 8/1976 | Washizuka et al. | 350/160 LC X |

*Primary Examiner*—John K. Corbin
*Assistant Examiner*—Rolf Hille
*Attorney, Agent, or Firm*—Flynn & Frishauf

[57] ABSTRACT

A liquid crystal display device comprising a liquid crystal display panel having a liquid crystal on the one side surface of which a first electrode group is grouped into a plurality of groups of segment electrodes adapted to define a character for each digit and on the other surface of which a second electrode group is grouped into a plurality of groups of segment electrodes which are different in configuration from the groups of segment electrodes in the first electrode group, each of the corresponding segment electrode groups of each digit in the second electrode group being connected to the outside; means for applying sequentially phase-shifted drive signals of a predetermined cycle to the respective segment electrode groups in said second electrode group; and means for applying segment drive signals corresponding to display data to the respective segment electrode groups of the first electrode group in synchronism with the respective drive signals applied to the second electrode group.

16 Claims, 8 Drawing Figures

LIQUID CRYSTAL DISPLAY DEVICE

BACKGROUND OF THE INVENTION

This invention relates to a liquid crystal display device.

A liquid crystal display panel used in a conventional liquid crystal display device has on one side surface of a liquid crystal thereof a plurality of digit electrodes corresponding to the number of display digits for selecting a digit to be displayed and on the other side surface a plurality of segment electrodes capable of forming characters, numerals, symbols and the like and disposed in a position opposite to that in which the plurality of digit electrodes are disposed. Where a character display is effected on such a liquid crystal display panel, it is necessary to provide a segment electrode drive signal system corresponding to the number of segment electrodes and it is also necessary to provide a digit electrode drive signal system corresponding to the number of digits. As a result, a larger number of connection lines are required between a drive circuit for driving the liquid crystal display panel and the liquid crystal display panel provided in the external of the drive circuit. If 8-digit characters are displayed on the display panel with seven segment electrodes used for each one digit, 56 connection lines are required for the segment electrode drive signal system only. Therefore, if the drivers, registers and operating circuits are provided in an LSI (Large Scale Integrated Circuit) form, a large number of connection lines which necessitate many external connection terminals in the LSI have to be used. As a result, it is not possible to increase the degree of integration of the LSI and a chip size thereof can not be made considerably smaller. Where an increased number of digits are employed, the drive signal system requires conection lines as obtained through multiplication of the number of segment electrodes per digit by the increased number of digits, resulting in the increase of the number of the connection lines and resulting in a very complicated circuit design.

SUMMARY OF THE INVENTION

It is accordingly the object of this invention to provide a liquid crystal display device, suitable for an LSI form, which is capable of reducing the number of connection lines required for the connection of the drive circuits and the external display panel and capable of very easily increasing the number of display digits without involving any complicated circuit design.

According to this invention there is provided a liquid crystal display comprising a liquid crystal display panel having a liquid crystal, a first electrode group and a second electrode group disposed in exact correspondence on one side of the liquid crystal opposite to the other side on which the first electrode group is placed, the first electrode group being grouped into a plurality of groups of segment electrodes adapted to define a character for each digit and each group of segment electrodes being independently connected to the outside, and the second electrode group being grouped into a plurality of segment electrodes which are different in configuration from the groups of segment electrodes in the first electrode group and define a character for each digit, each of the corresponding segment electrode groups of each digit in the second electrode being connected as the same group to the outside; means for applying sequentially phase-shifted drive signals of a predetermined cycle to the respective segment electrode groups of the second electrode group; and means for applying segment drive signals corresponding to display data to the respective segment electrode groups of the first electrode group in synchronism with the respective drive signals.

DETAILED DESCRIPTION OF THE PREFERRED EMBODIMENTS

Figure 1:
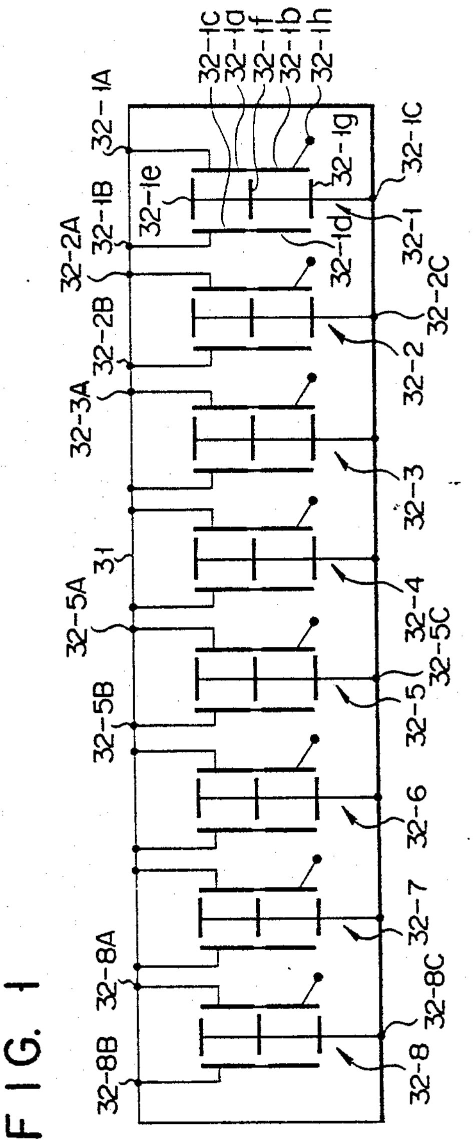
FIG. 1 is a diagrammatic view showing a first electrode group disposed on one side surface of a liquid crystal display panel in a liquid crystal display device according to an embodiment of this invention.

FIG. 1 shows a liquid crystal display panel having one electrode plate (referred to as a first display electrode plate) on one side surface of a liquid crystal not shown, where segment electrode groups 32-1 to 32-8 corresponding to an 8-digit display are provided on a transparent insulating substrate 31. A rightmost digit electrode group 32-1 consisting of seven electrode segments 32-1*a* to 32-1*g* and capable of displaying symbols such as numerals 0 to 9 and a minus sign "−" is disposed in the form of a figure eight and has a deciml point electrode 32-1*h*. The seven segment electrodes 32-1*a* to 32-1*g* are indicated by solid thick lines in FIG. 1. Among these, the segment electrodes 32-1*a*, 32-1*b* and 32-1*h* are connected together and the segment electrodes 32-1*c* and 32-1*d* are connected together, while the segment electrodes 32-1*e*, 32-1*f* and 32-1*g* are connected together. The segment electrodes 32-1*a*, 32-1*b* and 32-1*h* are connected as a group to a terminal 32-1A on the transparent substrate 31; the segment electrodes 32-1*c* and 32-1*d* are connected as a group to a terminal 32-1B on the transparent substrate 31 and the segment electrodes 32-1*e*, 32-1*f* and 32-1*g* are connected as a group to a terminal 32-1C. The remaining segment electrode groups 32-2 to 32-8 are identical in arrangement to the first mentioned segment electrode group 32-1.

Figure 2:
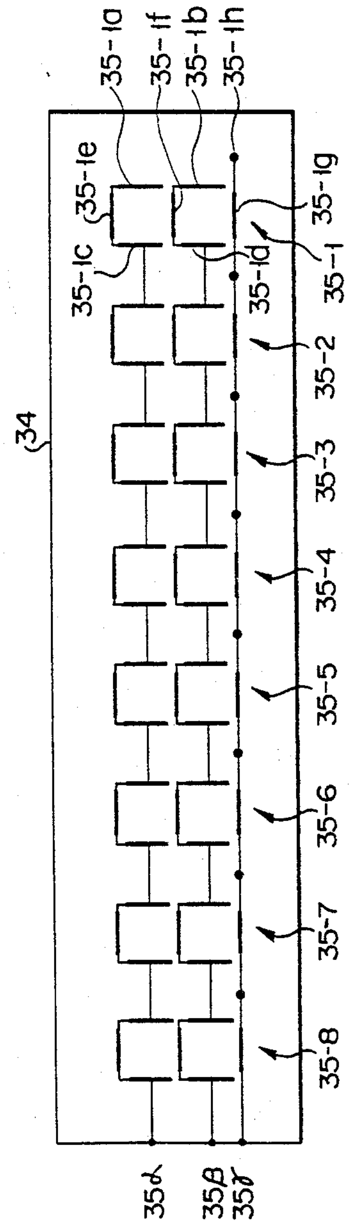
FIG. 2 is a diagrammatic view showing a second electrode group disposed on the other side surface of the liquid crystal display panel.

FIG. 2 shows the other electrode plate (referred to as a second display electrode plate) on the other side surface of the liquid crystal. The second display electrode plate is such that segment electrode groups 35-1 to 35-8 corresponding to an 8-digit display are provided on a transparent insulating substrate 34. The rightmost digit segment electrode group 35-1 includes segment electrodes 35-1*a* to 35-1*g* disposed in the form of a figure "eight" and has a decimal point electrode 35-1*h*. The segment electrodes 35-1*a*, 35-1*c* and 35-1*e* are connected together as a group; the segment electrodes 35-1*b*, 35-1*d* and 35-1*f* are connected together as a group; and the segment electrode 35-1*g* and decimal point electrode 35-1*h* are connected togther as a group. The segment electrodes 35-1*a*, 35-1*c* and 35-1*e* are connected to the corresponding segment electrodes in the remaining segment electrode groups 35-2 to 35-8 and connected as a group to a terminal 35α on the transparent substrate 34; the segment electrodes 351*b*, 35-1*d* and 35-1*f* are connected to the corresponding segment electrodes in the remaining segment electrode groups 35-2 to 35-8 and connected as a group to a terminal 35β on the transparent substrate 34; and the segment electrode 35-1g and decimal point electrode 35-1*h* are connected to the corresponding electrodes in the remaining electrode groups and connected as a group to a terminal 35γ. For ease of explanation the segment electrodes are indicated by solid thick lines in FIGS. 1 and 2, but segment electrodes having the same thickness as that of the connection lines therebetween may be used.

The driver circuit of a liquid crystal display panel as shown in FIGS. 1 and 2 will be explained by reference to FIG. 3.

Figure 3:
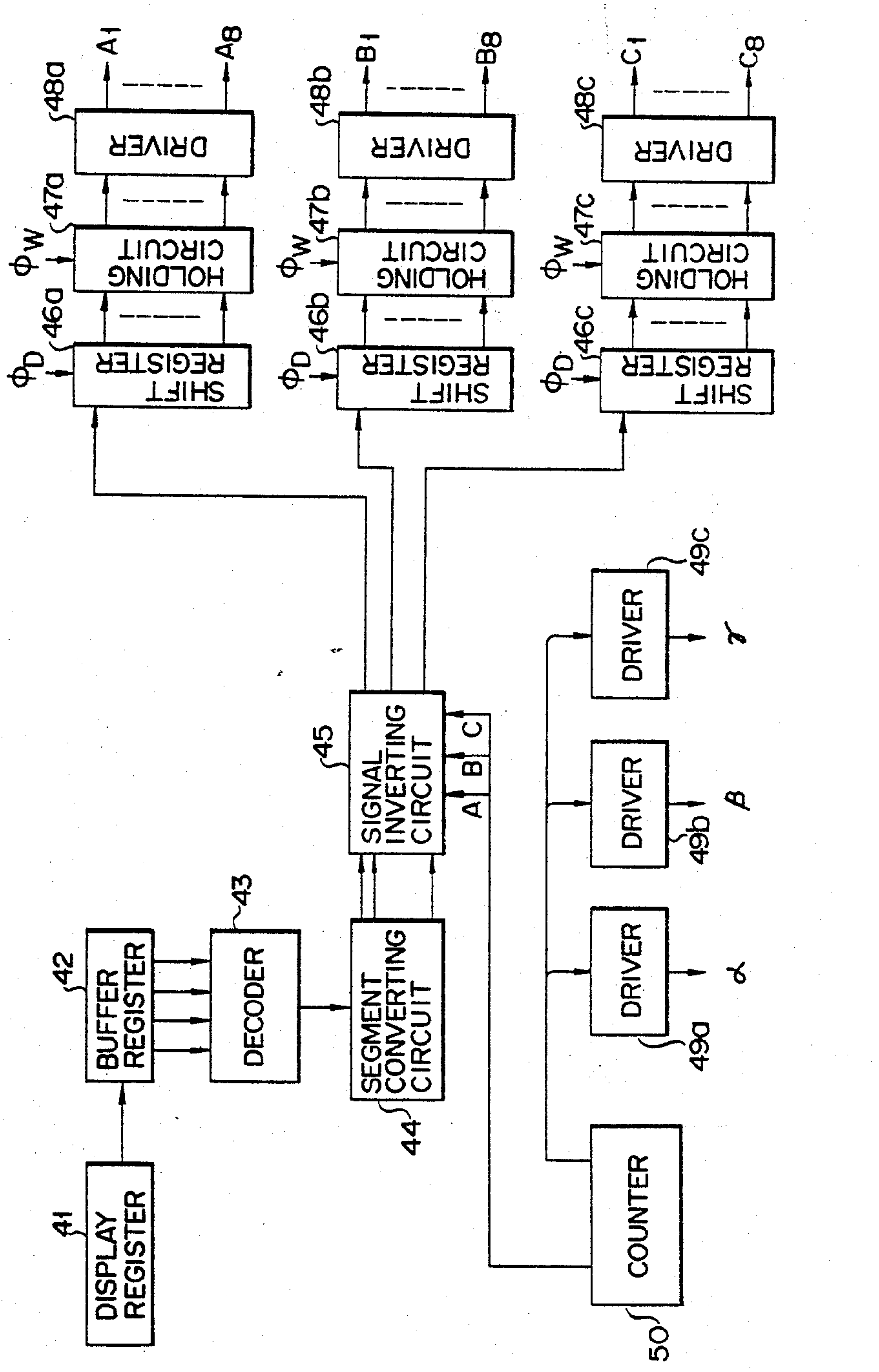
FIG. 3 is a block circuit diagram showing a display drive circuit for driving the liquid crystal display panel in FIGS. 1 and 2.
Figure 6:
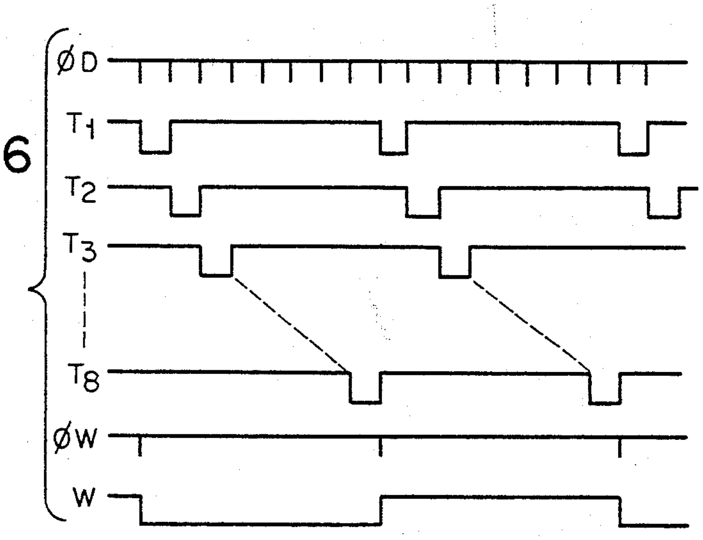
FIGS. 6 to 8 are timing charts for explaining the operation of the circuits in FIGS. 3, 4 and 5.

In FIG. 3 the display register 41 is adapted to store serially display data such as a calculated data from an operation section and registered data from a key board of, for example, a desk-top electronic calculator. The display data is stored in the display register in such a manner that the data is successively shifted from an upper significant digit to a lower significant digit and that the data in the least digit is restored in the most significant digit by means of shift pulses not shown. The most significant digit display data from the display register 41 is serially delivered to a 4-bit buffer register 42 where it is temporarily stored. The display data in the buffer register 42 is fed in a parallel mode to a decoder 43 where it is decoded into a character signal. The so decoded character signal is coupled to a segment coverting circuit 44. The segment converting circuit 44 generates a segment select signal for displaying a predetermined character. The output signal of the segment converting circuit 44 is simultaneously coupled to, for example, three 8-bit shift registers 46*a* to 46*c* through a signal inverting circuit 45 which is controlled by three kinds of signals (A, B and C) from a scale of 3 counter circuit 50. The shift registers 46*a* to 46*c* are adapted to receive an output signal of the signal inverting circuit 45 appearing at the every unit time of the digit or an input data upon receipt of a clock pulse φD which is generated for every four shift pulses for shifting the display data as shown in FIG. 6. The input data is successively shifted to the next stage in the registers 46*a* to 46*c* from the input side thereof and a prescribed digits of data to be displayed are stored at the given memory position.

Figure 7:
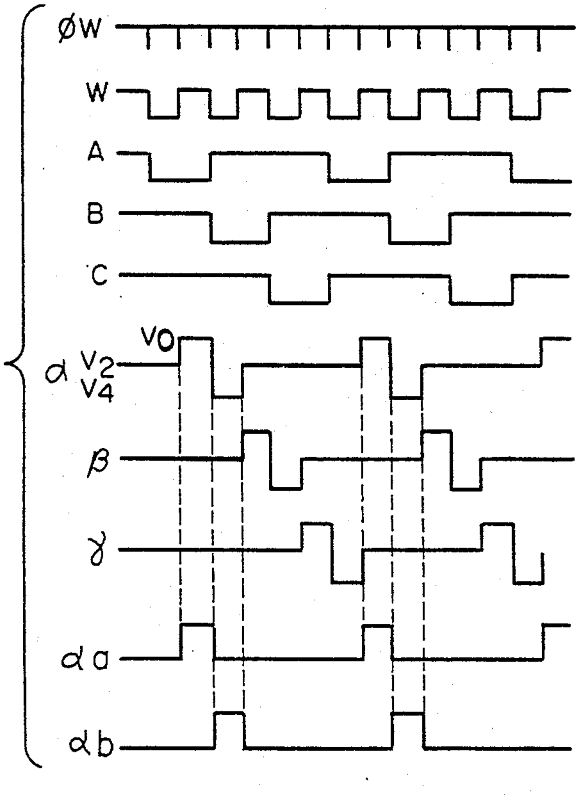

The display data of the shift registers 46*a* to 46*c* is transferred in a parallel mode to first, second and third holding circuits 47*a* to 47*c*. The display output signals of the holding circuits 47*a* to 47*c* are transferred to drivers 48*a* to 48*c* on the first display electrode plate, respectively, by a clock pulse φW as shown in FIG. 7. The outputs A1 to A8 of the first driver 48*a* are applied to the terminals 32-1A to 32-8A, respectively; the outputs B1 to B8 of the second driver 48*b* are applied to the terminals 32-1B to 32-8B, respectively; and the outputs C1 to C8 of the third driver 48*c* are applied to the terminals 32-1C to 32-8 C, respectively.

The output of the scale of 3 counter circuit 50 is applied to drivers 49*a*, 49*b* and 49*c*. Sequentially phase-shifted driver signals α, β and γ having a predetermined cycle appear at the terminals 35α, 35β and 35γ on the second display electrode plate in FIG. 2 from the drivers 49*a* to 49*c*.

Figure 4:
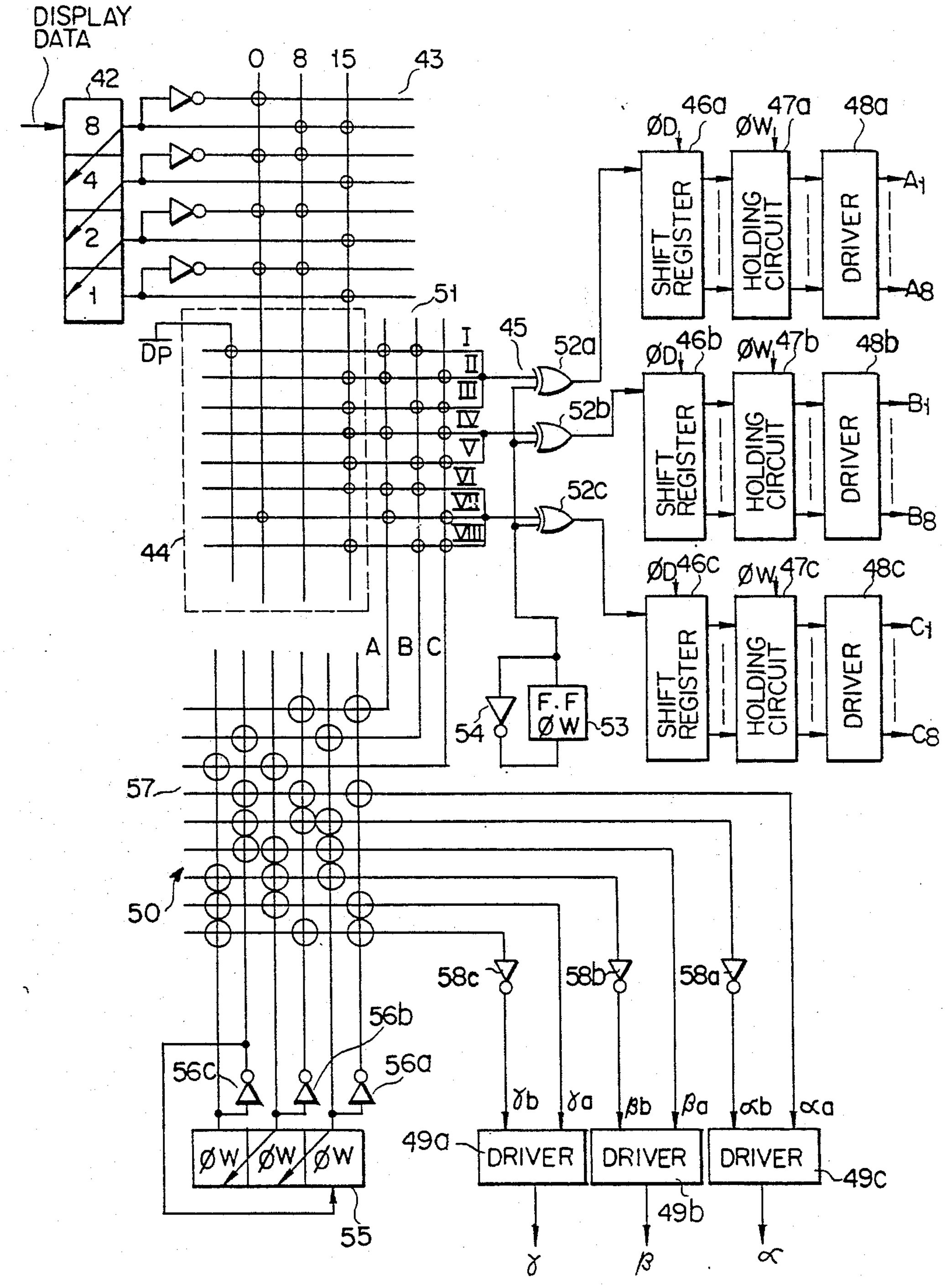
FIG. 4 is a block circuit diagram showing details of a main portion of the drive circuit in FIG. 3.

FIG. 4 shows the details of a main portion of the block circuit diagram in FIG. 3. In FIG. 4 the signal inverting circuit 45 comprises a decoder matrix 51 for signal inversion to which the output of the segment converting circuit 44 is coupled, exclusive OR circuits 52*a* to 52*c* to which the outputs of the decoder matrix are coupled, a delayed flip-flop circuit 53 adapted to apply to the exclusive OR circuits 52*a* to 52*c* an inversion control signal W as shown in FIGS. 6 and 7 and an inverter 54 connected between the input side and output side of the flip-flop circuit 53.

The signal inversion decoder matrix 51 has eight output lines I to VIII equal in number to the output lines of the segment converting circuit 44. The output lines I and III of the decoder matrix 51 are commonly connected to one input terminal of the exclusive OR circuit 52*a;* the output lines IV to V, to one input terminal of the exclusive OR circuit 52*b;* and the output lines VI to VIII, to one input terminal of the exclusive OR circuit 52*c*. Control signals A, B and C as shown in FIG. 7 are fed from the scale of 3 counter circuit 50 to the corresponding inputs of the matrix 51. The control signals A, B and C control the decoding operation of the decoder matrix 51 so as to obtain segment signals corresponding to the drive signals α, β and γ of the second display electrode plate.

The scale of 3 counter circuit 50 comprises a 3-bit counter 55 and a decoder matrix 57 to which the bit outputs of the 3-bit counter 55 are coupled directly and through inverters 56*a* to 56*c*. Three outputs of the decoder matrix 57 are supplied as the control signals A, B and C to the decoder matrix 51. The remaining outputs of the decoder matrix decoder 57 are fed as control signals *αa, αb, βa, βb, γa* and *γb* directly, and through the inverters 58*a* to 58*c*, to the drivers 49*a* to 49*c* on the second display electrode plate.

Figure 5:
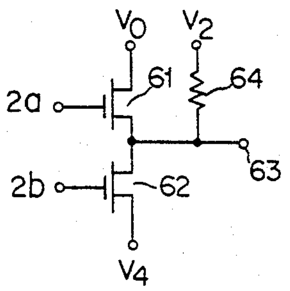
FIG. 5 is a circuit showing, by way of example, a driver of the second display electrode group in FIG. 4.

FIG. 5 shows, by way of example, a detail of the driver 49*a* shown in FIG 4. Two field effect transistors 61 and 62 are serially connected between a power source $V_0$ and a power source $V_4$ and a common junction between the field effect transistors 61, 62 is connected to the output terminal 63. The signals *αa* and *αb* are applied to the gate of the transistors 61 and 62 and a power source $V_2$ is connected through a resistor 64. That is, the power source voltages $V_0$, $V_2$ and $V_4$ are used, with $V_0$ as a reference, in driving the liquid crystal. Then the potential difference of three steps is applied between the first display electrode groups and the second display electrode groups, the liquid crystal is driven for display. The other drivers 49*b* and 49*c* are similar in arrangement to the driver 49*a*.

The signals *αa* and *αb*, each, have a time width corresponding to one word and a cycle corresponding to the six word time width. The signal *αb* is so set that it is generated one word time width after the signal *αa* is generated. In FIG. 5 if the signals *αa* and *αb* are not delivered to the gates of the transistors 61 and 62, the transistors 61 and 62 are both in the OFF state and a signal α on the output terminal 63 is at the potential level $V_2$ as shown in FIG. 7. When the signal *αa* is applied to the gate of the transistor 61, the transistor 61 is turned ON and a potential $V_0$ appears at the output terminal 63. With a delay of one word time width the signal *αb* is sequentially generated. The signal *αb* is applied to the gate of the transistor 62 to cause the transistor 61 to be turned OFF and the transistor 62 to be turned ON. As a result, a potential $V_4$ appears at the output terminal 63. In this way, with the potential $V_2$ as a reference the potential $V_0$ is followed by the potential $V_4$ with a delay of one word time width and a signal α with a cycle corresponding to a six word time width appears at the output terminal 63. The signal α is followed by signals β and γ which sequentially appear with a delay of a two word time width from the corresponding output terminals of the drivers 49b and 49c as shown in FIG. 7. The above-mentioned decoders 43, 51 and 57 can be constituted by, for example, a known diode matrix.

The operation of the liquid crystal display device of the embodiment as has been described above will now be explained below.

A display data stored in the display register 41 is read out in synchronism with eight digit pulses $T_1$ to $T_8$ as shown in FIG. 6 and stored digit by digit in the buffer register 42. The display data in the buffer register 42, after, being decoded at a decoder 43, is converted at the segment converting circuit 44 into a segment signal. The segment signal is delivered to the signal inverting decoder 51 in the signal inverting circuit 45 where it is controlled by signals A, B and C supplied from the decoder 57 in the scale of 3 counter circuit 50 and having a time width corresponding to two words as shown in FIG. 7. The segment signal is delivered from the decoder 51 to the exclusive OR circuits 52a to 52c. The exclusive OR circuits 52a to 52c are adapted to be controlled by a signal W which is outputted from the flip-flop circuit 53 and inverted for every word as shown in FIGS. 6 and 7. That is, the outputs of the exclusive OR circuit 52a to 52c are inverted in synchronism with the signal W. The outputs of the exclusive OR circuits 52a to 52c are successively written into the respective shift registers upon receipt of a clock pulse φD. In this case, the decoding operation of the decoder 51 for signal inversion is controlled by the control signal A from the scale of 3 counter circuit 50. At this time, the outputs of the decoder 51, which correspond to one digit time, are successively stored at the rate of one word in the shift registers 46a to 46c through the exclusive OR circuits 52a to 52c. The data in the shift registers 46a to 46c are transferred to the holding circuits 47a to 47c upon receipt of a clock pulse φW and the drivers 48a to 48c are operated according to the data of the holding circuits 47a to 47c to generate drive signals A1 to A8, B1 to B8 and C1 to C8, respectively, which are applied to the terminals 32-1A to 32-8A, 32-1B to 32-8B and 32-1C to 32-8C, respectively, of the liquid crystal display panel as shown in FIG. 1.

At the same time, the decoder 57 of the scale of 3 counter circuit 50 generates signals αa and αb, according to the content of the counter 55, which are applied to the driver 49a. The drive signal α appears from the driver 49a and is delivered to the terminal 35α in FIG. 2. As a result, the liquid crystal is driven for display between the upper segment electrodes of α group in all the digits of the second display electrode plate in FIG. 2, for example, those desired segment electrodes 32-1a, 32-1c and 32-1e of the segment electrode groups 32-1 to 32-8 in FIG. 1 to which the drive signal is applied. The display operation continues during the two word time period, but in this case the drive signal α is inverted for each one word time period and an AC drive of the liquid crystal is thus effected.

The decoding operation of the decoder 51 is controlled by a control signal B from the decoder 57 and the outputs of the decoder 51 are stored at the rate of one word in the shift registers 46a to 46c through the exclusive OR circuits 52a to 52c. The data so stored in the shift registers 46a to 46c is transferred to the holding circuits 47a to 47c upon receipt of the clock pulse φW and the drivers 48a to 48c of the first display electrode plate is operated according to the data stored in the holding circuits 47a to 47c, thus providing segment signals to the segment electrode groups 32-1 to 32-8 in all the digits of the first display electrode plate. At this time, the decoder 57 in the counter circuit 50 generates signals βa and βb in accordance with the content of the counter 55 and the β drive signal is generated from the driver 49b in the second display electrode plate. As a result, the liquid crystal is driven for display between the intermediate segment electrodes of β group in all the digits of the second display electrode plate in FIG. 2 and, for example, those desired segment electrodes 32-1b, 32-1d and 32-1f of the segment electrode groups 32-1 to 32-8 in FIG. 1.

The decoding operation of the decoder 51 is controlled by control signal C from the decoder 57 and the outputs of the decoder 51 are stored at the rate of one word in the shift registers 46a to 46c through the exclusive OR circuits 52a to 52c. The data so stored in the shift registers 46a to 46c is transferred to the holding circuits 47a to 47c upon receipt of the clock pulse φW and the drivers 48a to 48c in the first display electrode plate are operated in accordance with the data of the holding circuits 47a to 47c. At this time, the decoder 57 in the counter circuit 50 generates signals γa and γb according to the content of the counter 55 and the driver 49c in the second display electrode plate generates a γ drive signal. As a result, the liquid crystal is driven for display between the lower segment electrodes of γ group in all the digits of the second display electrode plate and, for example, those desired segment electrodes 32-1g and 32-1h in FIG. 1.

Since the data outputted from the decoder 51 according to the control signals A, B and C, when transmitted through the shift registers 46a to 46c to the holding circuits 47a to 47c upon receipt of the clock pulse φW, is delayed by an amount corresponding to one word, the signals α, β and γ are set to be sequentially generated with a delay of one word with respect to the control signals A, B and C.

With the above-mentioned embodiment the display electrodes on the second display electrode plate are divided into three groups, α, β and γ. At one time, all the digits of α group are driven for display and then all the digits of β and γ groups are driven in this order for display.

Figure 8:
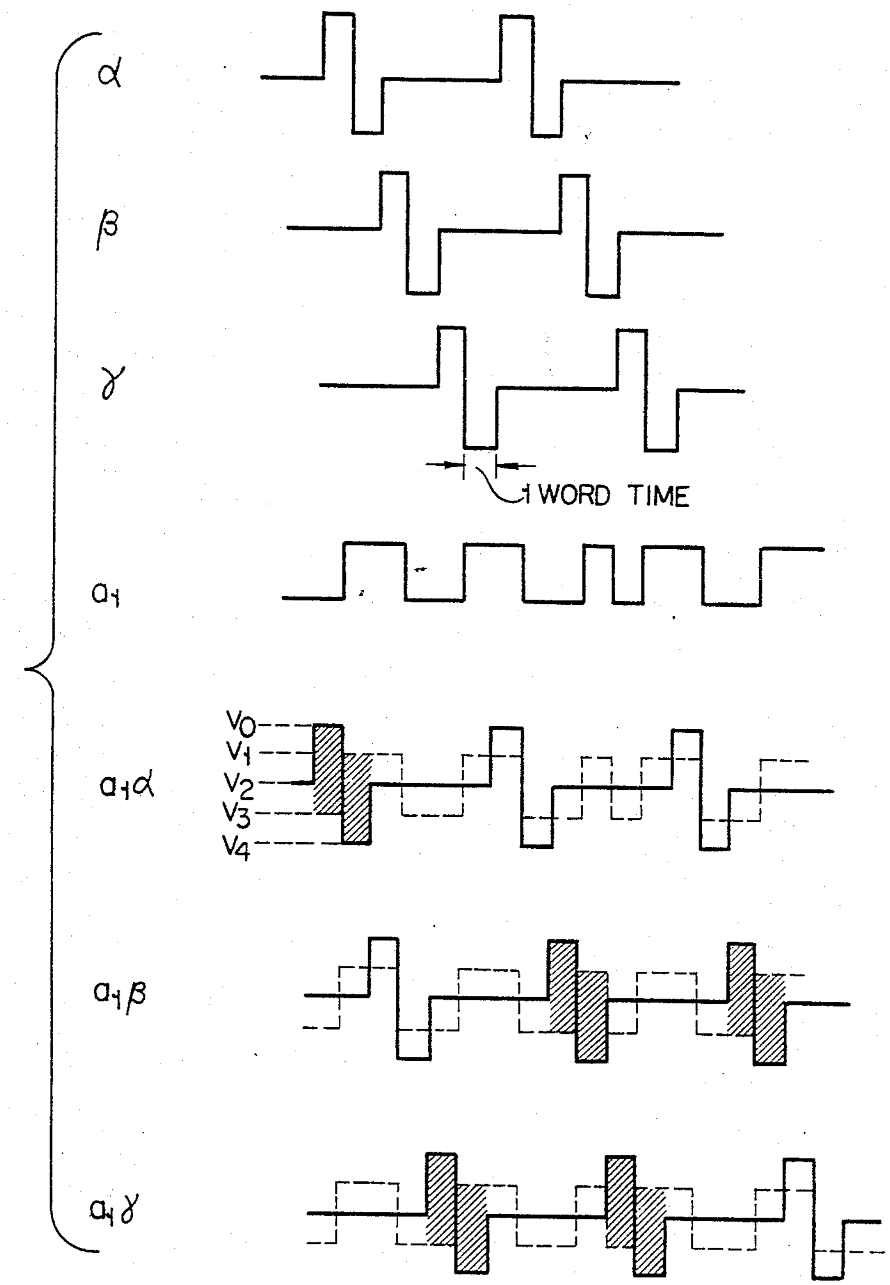

FIG. 8 shows a display timing when a segment signal a1 is applied with respect to the second display electrode plate drive signals α, β and γ. When the above-mentioned segment signal a1 is applied, if a potential difference between the segment electrode on the first display electrode plate and the electrode on the second display electrode plate shows more than three steps as indicated by a shaded area in FIG. 8, the liquid crystal is driven for display.

A table I shows the application of the drive signals to the terminals 32-1A to 32-8A, 32-1B to 32-8B and 32-1C to 32-8C with the drive signals α,β and γ plotted as a column and numerals 0 to 9 and decimal point plotted as a raw. In Table I the terminals 32-1A to 32-8A are represented by a terminal E; the terminals 32-1B to 32-8B, by a terminal F; and the terminals 32-1C to 32-8C, by a terminal G.

Table I

| | α | β | γ |
|---|---|---|---|
| 0 | EFG | EF | G |
| 1 | E | E | |
| 2 | E G | FG | G |
| 3 | E G | E G | G |
| 4 | EF | E G | |
| 5 | FG | E G | G |
| 6 | FG | EFG | G |
| 7 | E G | E | |
| 8 | EFG | EFG | G |
| 9 | EFG | E G | |
| . | | | E |

Suppose, for example, that the numeral "2" is displayed. When in this case an α drive signal is applied to the terminal 35α, a segment drive signal is applied to the terminals E and G so as to provide a predetermined potential difference between the first and second display electrode plates. In this case, the segment electrodes 32-1*a* and 32-1*e* in the least digit position are displayed when viewed on the first display electrode plate side only. When a drive signal is applied to the segment terminals F and G so that it corresponds to the β drive signal, those portions of the first display electrode plate which correspond to, for example, the segment electrodes 32-1*d* and 32-1*f* are displayed. When a drive signal is applied to the segment terminal G so that it corresponds to the γ drive signal, that portion of the first display electrode plate which corresponds to, for example, the segment electrode 32-1*g* is driven for display. As a result, numeral "2" is displayed. Likewise, the other numerals and decimal point can be displayed on the liquid crystal display panel.

According to this embodiment, therefore, the number of output lines in the signal inverting circuit 45 can be reduced to three in number and it is also possible to provide a simple circuit connection as compared with a conventional one. Furthermore, three connection lines have only to be provided for each digit in the first display electrode plate and the liquid crystal display device can easily be provided in an LSI form. If the number of display digits is increased, it is only necessary that a flip-flop circuit be added to both the shift registers 46*a* to 46*c* and holding circuits 47*a* to 47*c*. Since the same clock pulse can be employed for the three blocks in the first display electrode plate, it is possible to provide an advantageous circuit design. Although in the above-mentioned embodiment the segment electrode groups of both first and second display electrode plates are divided into three signal groups, this invention can also be put into practice, if they are divided into any other number of groups.

What is claimed is:

1. A plural digit liquid crystal display device comprising:

a plural digit liquid crystal display panel including a liquid crystal;

a plurality of first electrode groups disposed on one side of said display panel, each of said first electrode groups corresponding to and at least partially defining a respective digit of said plural digit display device and each of said fist electrode groups including a plurality of segment electrodes;

a plurality of second electrode groups disposed on the side of the display panel opposite to the side on which said first electrode group is disposed, each of said second electrode groups corresponding to and at least partially defining a respective digit of said plural digit display device and each of said second electrode groups including a plurality of segment electrodes;

said electrodes of said first electrode groups being in exact correspondence with said electrodes of said second electrode groups;

each of said first electrode groups being grouped into a plurality of first sub-groups of segment electrodes, said segment electrodes of each first sub-group of segment electrodes being commonly connected together;

each of said second electrode groups being groups into a plurality of second sub-groups of segment electrodes which are different in configuration from said first sub-groups of segment electrodes, said segment electrodes of each second sub-group of segment electrodes being commonly connected together and corresponding second sub-groups of electrodes of each of said second electrode groups for each digit being commonly connected together;

means for sequentially applying phase-shifted drive signals of a predetermined cycle to the respective commonly connected segment electrode sub-groups of said second electrode groups; and means for applying segment drive signals, corresponding to data to be displayed, simultaneously to a selected segment electrode sub-group of selected ones of said first electrode groups in synchronism with and concurrently with said application of a respective phase-shifted drive signal to effect a data display.

2. A plural digit liquid crystal display device according to claim 1, in which said means for applying said segment drive signals to said segment electrode sub-groups of said first electrode groups comprises:

a decoder responsive to display data for forming a character signal from the display data;

a segment converting circuit coupled to said decoder for forming a segment selecting signal from the character signal of the decoder:

a plurality of holding circuits to which the outputs of the segment converting circuit are delivered; and a plurality of drivers coupled to said holding circuits adapted to generate segment drive signals in accordance with the outputs of the holding circuits.

3. A plural digit liquid crystal display device according to claim 1, comprising means for driving said liquid crystal in an AC mode, said driving means comprising:

a drive signal supplying means coupled to said second electrode groups for supplying a first drive signal to said second electrode groups which continues during a two-word time period;

means for inverting said first drive signal for each one-word time period to produce a second drive signal; and means for applying said second drive signal to said first electrode groups as a segment drive signal which is inverted for each one-word cycle with respect to said first drive signal.

4. A plural digit liquid crystal display device according to claim 1, in which said means for applying sequentially phase-shifted drive signals of a predetermined cycle comprises:

a counter for counting clock pulsed and having a cycle which is an *n*th part of a one-word time period, where *n* is an integer larger than 1; and a decoder means coupled to said counter for generating, according to the contents of said counter, sequentially phase-shifted drive signals of a predetermined cycle and a control signal for synchronizing said segment drive signal with said sequentially phase-shifted drive signals of a predetermined cycle.

5. A plural digit liquid crystal display device according to claim 1 wherein said liquid crystal display panel comprises first terminals respectively coupled to said plurality of first sub-groups of segment electrodes of said first electrode groups for connection thereto of said segment drives; and a plurality of second terminals respectively coupled to said purality of second sub-groups of segment electrodes of said second electrode groups for connection of said respective phase-shifted drive signals thereto.

6. A plural digit liquid crystal display device according to claim 1 wherein each of said digits comprises seven segment electrodes arranged in a figure 8 configuration, each of said first electrode groups comprising three sub-groups of segment electrodes, two of said sub-groups comprising two segment electrodes and one of said sub-groups comprising three electrodes, the electrodes of each of said sub-groups being commonly connected together, and each of said second electrode groups comprising three sub-groups of segment electrodes, two of said sub-groups of electrodes of said second electrode groups comprising three interconnected segment electrodes and the third sub-group comprising one segment electrode, corresponding electrode sub-groups of each digit being commonly connected together for receiving respective phase-shifted drive signals.

7. A plural digit liquid crystal display device according to claim 6 wherein said first and second electrode groups each comprise electrodes defining a further indicia interposed between said digits, said electrodes defining said further indicia being connected to one of said sub-groups of electrodes of said first and second electrode groups, respectively.

8. A plural digit liquid crystal display device according to claim 1, wherein said second electrode groups are each divided into three sub-groups, the corresponding sub-groups of each of said second groups being commonly connected together.

9. A plural digit liquid crystal display device according to claim 8, wherein said segment electrodes of each of said first and second groups of electrodes are arranged in a figure 8 configuration.

10. A plural digit liquid crystal display device according to claim 1, wherein each of said first electrode groups comprises three sub-groups of electrodes, the segment electrodes of said first electrode groups being arranged in a figure 8 configuration.

11. A plural digit liquid crystal display device according to claim 1, wherein said means for sequentially applying phase-shifted drive applies said phase-shifted drive signals to respective commonly connected segment electrode sub-groups of all of said second electrode groups at the same time.

12. A plural digit liquid crystal display device according to claim 11, wherein said means for applying segment drive signals applies said segment drive signals to a selected one of said segment electrode sub-groups of a plurality of said first electrode groups in synchronism with and concurrently with said application of a respective phase-shifted drive signal.

13. A plural digit liquid crystal display device according to claim 1, wherein said segments of said first electrode group are vertically divided into respective sub-groups, and said segments of said second electrode groups are horizontally divided into respective sub-groups.

14. A plural digit liquid crystal display device according to claim 1 wherein said second electrode groups each comprise seven segment electrodes arranged in a figure 8 pattern.

15. A plural digit liquid crystal display device according to claim 14 wherein said first electrode groups each comprise seven segment electrodes arranged in a figure 8 pattern.

16. A plural digit liquid crystal display device according to claim 5 wherein the connections of said first terminals to said plurality of first sub-groups of segment electrodes do not cross said connections between said second terminals and said respective second sub-groups of segment electrodes.

* * * * *

Notice of Adverse Decisions in Interference

In Interference No. 102,384, involving Patent No. 4,113,361, H. Nakano, LIQUID CRYSTAL DISPLAY DEVICE, final judgment adverse to the patentee was rendered Feb. 5, 1991, as to claims 1-16.

(*Official Gazette September 3, 1991.*)